Sept. 4, 1962 R. F. COBAUGH 3,052,750
HIGH TENSILE SPLICE
Filed Sept. 15, 1959
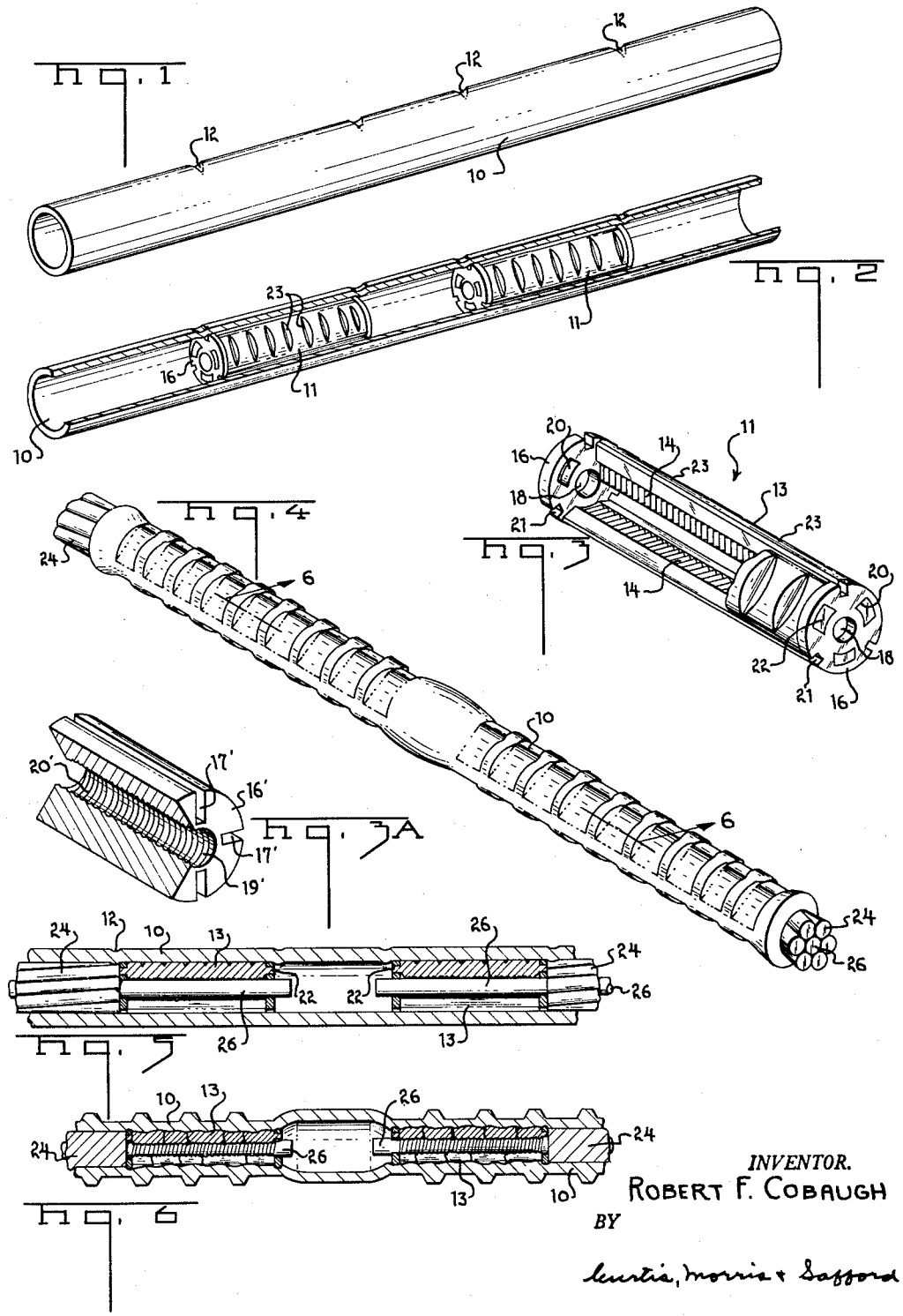
INVENTOR.
ROBERT F. COBAUGH
BY 3,052,750
HIGH TENSILE SPLICE
Robert F. Cobaugh, Harrisburg, Pa., assignor to
AMP Incorporated, Harrisburg, Pa.
Filed Sept. 15, 1959, Ser. No. 840,065
7 Claims. (Cl. 174—94)

In the transmission of electrical energy, it is common to use a conductor comprised of a plurality of braided strands of aluminum wire, with a central steel wire or core disposed longitudinally. The steel strand increases the tensile strength of the conductor considerably. One of the difficulties in using this type of wire is the problem of terminating it or joining two of these wires together. It is an object of this invention to provide a new and improved termination for such wires whereby the ends may be joined together quite easily with a minimum of effort.

It is an object of this invention to provide a means for joining steel stranded conductors together by cold-forging a ferrule thereto. It is also an object of this invention to provide such a connection whereby a plurality of frangible inserts are ruptured and broken into small pieces during the crimping operation to key the ferrule and conductor together. These inserts may be externally notched to cause the insert to crack in predetermined areas and be embedded into the connector. This application constitutes a continuation-in-part of my previously filed application, Serial No. 821,181, filed June 18, 1959, now abandoned.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is a perspective view of a connecting means illustrating principles of this invention;

FIGURE 2 is a view similar to FIGURE 1 with the outer sleeve partially broken away;

FIGURE 3 is a partially cut-away perspective view of one of the inserts;

FIGURE 3A is a view similar to FIGURE 3 illustrating another embodiment of a suitable insert;

FIGURE 4 is a view illustrating the connector of FIGURE 1 crimped onto a pair of conductors joining them together;

FIGURE 5 is a sectional view showing conductors situated within the connector prior to crimping; and FIGURE 6 is a sectional view taken along plane 6—6 of FIGURE 4.

As shown in FIGURE 2, the connector includes an outer metal ferrule 10 (preferably of aluminum), with a plurality of inserts disposed within the ferrule 10. The preferment includes two inserts 11 positioned adjacent to each other and disposed on opposite sides of the midportion of the ferrule. A plurality of indents 12 in the ferrule 10 serve to locate the inserts and retain them in position.

The inserts shown in the preferred embodiment are identical and comprise arcuate members 13 (FIGURE 3) having grooves or serrations 14 on the inside surface. Advantageously these inserts may be made of powdered metal which is easily manufactured, very hard and highly frangible. (The term "powdered metal" refers to objects made by the "powdered metallurgical" process. A suitable composition includes 97.15% Fe, 2% Cu, .85% C; cf. "Physical Properties of Reduced Iron Powder Plus Graphite and Copper," by George Stern, published in "The Iron Age," March 24, 1949). This internal diameter is slightly larger than the steel core of the conductor that it is designed to accommodate. A pair of discs 16 have a central aperture 18 adapted to permit passage of the central core of the conductor therethrough. Arcuate slots 20 in the discs accommodate flanges 22 on the arcuate members 13. These slots are disposed at 120° from each other. The insert is assembled by disposing the discs parallel to each other with the slots 20 aligned. The flanges are forced fitted into their respective slots. The arcuate members 13 form less than a complete cylinder so that openings are disposed between each of the members 13 in assembled position. Notches 21 in the edge of the discs 16 correspond with the openings between the members 13. Grooves 23 are impressed circumferentially into the outside surface of the members 13 at regular intervals along the axial length of insert.

Another embodiment of a suitable insert is shown in FIGURE 3A. An integral cylindrical member 16' with longitudinal slots 17' disposed along the outer surface of the insert. A central aperture 19' contains internal serrations 20'. The illustrated embodiment shows slots 17' forming quadrants of 90°.

When it is desired to crimp a pair of conductors 24 having a central steel core 26 therein, the conductors are prepared by severing a length from the outer strands so that the core projects therefrom (note FIGURE 5). The conductor is inserted into one end of the ferrule until the end of the strands abut the outer end of the first insert. The central steel core is threaded internally of the inserts and projects through the inserts into the center of the connector. The other conductor is prepared in a similar manner and is inserted into the opposite end of the ferrule with the steel core projecting through the corresponding inserts.

A plurality of crimps are then impressed on each end of the ferrule. The innermost crimps serve to deform the outer metal ferrule and also to fracture the metal inserts so that only a plurality of small pieces remain. This action is promoted by the openings between the arcuate members which render the inserts easily fractured. As shown in FIGURE 6, the crumbled pieces of the inserts bite into the outer aluminum ferrule and the inner steel core. This biting action is assisted by the serrations 14 on the inside of the inserts. Additional crimps on the outside of the ferrule secure the ferrule to the strands of the conductor. The other conductor is also joined in a similar fashion. As shown in the drawings, nine crimps on each side of the connector are sufficient to crimp a size 1/0 wire. This is in contrast to the prior art devices which require approximately thirty-two crimps on each side for this size wire.

Thus, the device disclosed herein permits a crimped connection through an aluminum ferrule to a material which is harder than the aluminum, e.g. steel. Also, it permits termination through aluminum to metals requiring crimping pressures above 80,000 p.s.i. into a range of 200,000 p.s.i. Although these extreme pressures are employed, the size of the connector has been reduced to about one-third the size of connectors employed in the prior art in similar circumstances.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A device for connecting electrical conductors having at least one steel strand, comprising an aluminum ferrule, a plurality of cylindrically configured inserts made of highly frangible powdered metal within the ferrule, said inserts providing a central aperture adapted to accommodate the steel strand, a plurality of serrations in said inserts, said inserts adapted to be fractured into small pieces upon the application of crimping pressure to the outside of the aluminum ferrule.

2. The device of claim 1 including radial slots in the outer surface of said inserts and running longitudinally of said inserts.

3. The device of claim 1 wherein the inserts are formed by arcuate members spaced from each other about a common axis.

4. The device of claim 1 wherein the inserts are formed by a pair of parallel circular discs with arcuate members fitted into the discs at spaced intervals and notches in the discs corresponding to the spaces between the members.

5. A connection between a pair of wires of the type having braided conductive strands and a central steel core including an outer aluminum ferrule, a plurality of metal inserts made of highly frangible powdered metal, said inserts having longitudinal slots radially therein on the outside surface, the steel core of the conductor disposed within the inserts, said inserts ruptured into small pieces and crimped to said steel core, said aluminum ferrule also crimped in the vicinity of the inserts, and said aluminum ferrule crimped onto the outer braided conductors.

6. A device for connecting a pair of steel core stranded conductors including an outer aluminum ferrule, a pair of inserts made of highly frangible powdered metal disposed within the aluminum ferrule adjacent the centerpoint, a similar pair of inserts disposed on the opposite side of the centerpoint, the steel core of a conductor within one insert, the stranded portion of the conductor within the ferrule, a second conductor similarly disposed on the opposite inserts, and crimped sections along each insert serving to crumble the inserts and causing them to bite into the steel conductor and the inside surface of the outer aluminum ferrule, and additional crimped sections crimping the aluminum ferrule to the stranded conductors.

7. A device for connecting an electrical conductor having at least one steel strand, comprising an aluminum ferrule, a plurality of cylindrically configured inserts within the ferrule, said inserts being formed by a pair of parallel circular disks with radial notches therein, a plurality of arcuate members made from highly frangible powdered metal, fitted into the notches in the disks to form radial slots in the outer surface of said inserts running longitudinally of said inserts, said inserts providing a central aperture adapted to accommodate the steel strands, a plurality of serrations in said insert, and said inserts adapted to be completely fractured upon the application of crimping pressure to the outside of said ferrule.

References Cited in the file of this patent

UNITED STATES PATENTS

| | | |
|---|---|---|
| 2,251,189 | Jensen | July 29, 1941 |
| 2,279,677 | Heinrich | Apr. 14, 1942 |

FOREIGN PATENTS

| | | |
|---|---|---|
| 561,859 | Great Britain | July 7, 1944 |